(12) United States Patent
Qiu et al.

(10) Patent No.: US 12,027,941 B2
(45) Date of Patent: Jul. 2, 2024

(54) BEARING ASSEMBLY CAPABLE OF PREVENTING LUBRICANT FROM BEING THROWN OUT AND BEARING WIRE PLATE THEREOF

(71) Applicant: DONGGUAN HANSHUO PLASTIC CO., LTD., Dongguan (CN)

(72) Inventors: Guoguang Qiu, Dongguan (CN); Ronghua Diao, Dongguan (CN); Liuchun Xiang, Dongguan (CN)

(73) Assignee: DONGGUAN HANSHUO PLASTIC CO., LTD., Dongguan (CN)

( * ) Notice: Subject to any disclaimer, the term of this patent is extended or adjusted under 35 U.S.C. 154(b) by 238 days.

(21) Appl. No.: 17/853,965

(22) Filed: Jun. 30, 2022

(65) Prior Publication Data
US 2024/0006952 A1 Jan. 4, 2024

(51) Int. Cl.
*H02K 5/16* (2006.01)
(52) U.S. Cl.
CPC ...................... *H02K 5/16* (2013.01)
(58) Field of Classification Search
CPC ............ H02K 5/16; H02K 5/15; H02K 5/161; H02K 5/163; H02K 5/165; H02K 3/32; H02K 7/08; H02K 7/085; H02K 7/086
USPC ..................................................... 310/90, 91
See application file for complete search history.

(56) References Cited

U.S. PATENT DOCUMENTS

| 5,157,295 A | * | 10/1992 | Stefansky | H02K 21/22 |
| | | | | 310/90 |
| 5,686,771 A | * | 11/1997 | Ishizuka | H02K 5/1737 |
| | | | | 310/90 |
| 2024/0006952 A1 | * | 1/2024 | Qiu | H02K 5/16 |

FOREIGN PATENT DOCUMENTS

| CN | 215733808 U | * | 2/2022 |
| CN | 216530780 U | * | 5/2022 |
| JP | 2016183774 A | * | 10/2016 |

* cited by examiner

*Primary Examiner* — Robert W Horn

(57) ABSTRACT

Disclosed is a bearing assembly capable of preventing a lubricant from being thrown out. A bearing and a wire plate are fixedly mounted via a fixed portion and an inner ring which can prevent the lubricant from being thrown out during use, and the lubricant can be directly added to the bearing in use. The present disclosure is mounted on a motor via a first raised ring and a second raised ring, and the first raised ring and the second raised ring can prevent dust from entering the bearing. The present disclosure has simple structure and reasonable design. A wire frame for a bearing is provided. The bearing is mounted in a bearing mounting portion. With the inner ring, the sealability between the bearing and the wire plate is better, so as to prevent the lubricant in the bearing from being thrown out during the rotation of the bearing.

10 Claims, 4 Drawing Sheets

BEARING ASSEMBLY CAPABLE OF PREVENTING LUBRICANT FROM BEING THROWN OUT AND BEARING WIRE PLATE THEREOF

TECHNICAL FIELD

The present disclosure relates to the technical field of bearings, and in particular to a bearing assembly capable of preventing a lubricant from being thrown out and a bearing wire plate thereof.

BACKGROUND ART

A motor is a device that converts electrical energy into mechanical energy to drive a production device to operate. Because the motor continues to run at a high speed for a long time, it will cause its running bearing to heat up, and the lubricating oil is gradually consumed. Therefore, the lubricant needs to be added to the motor in a specified period. At present, how to prevent oil throwing and oil storing has not been taken into consideration in the oil-containing structure design of many fan plants. Therefore, the lubricant needs to be added to the bearing of the fan all the time in the process of use, which is inconvenient in use. Existing bearing wire plates tend to throw the lubricant out during the rotation of the motor after the lubricant is added, and also tend to allow dust to enter the bearing during the long-time use.

SUMMARY OF THE INVENTION

The present disclosure provides a bearing assembly capable of preventing a lubricant from being thrown out and a bearing wire plate thereof directing at the problems in the prior art.

In order to solve the above-mentioned technical problems, the present disclosure adopts the following technical solution.

The present disclosure provides a bearing assembly capable of preventing a lubricant from being thrown out, including: a bearing and a wire plate, a bearing mounting portion being disposed at an upper end of the wire plate, the bearing mounting portion being disposed concavely, an inner ring being disposed in the bearing mounting portion, a fixed portion being disposed at each of the two ends of the bearing, a first raised ring and a second raised ring being disposed in the middle of a lower end of the wire plate, a wiring groove being formed in the wire plate, and the inner wall of the inner ring is in abutting connection with an outer wall of the fixed portion.

Preferably, a plurality of extending portions are disposed at a front end of the fixed portion.

Preferably, the height of the first raised ring is smaller than the height of the second raised ring.

Preferably, protective plates are disposed at the lower end of the wire plate, a plurality of wire winding grooves are formed in the wire plate, the protective plate is disposed at an interval from the wire winding groove, an extending plate is disposed on an upper portion of the wire winding groove, and the extending plate and the wire plate are integrally formed.

Preferably, reinforcing ribs are disposed both inside the bearing and the wire plate.

Preferably, a fixed plate is disposed at a lower end of the bearing, and the fixed portion at the lower end of the bearing is sleeved with the fixed plate.

Preferably, the height of the inner ring is greater than the height of the fixed portion.

A wire plate for a bearing includes a wire plate, a bearing mounting portion being disposed in the middle of the wire plate, an inner ring is disposed at an upper end of the wire plate, a first raised ring and a second raised ring are disposed in the middle of a lower end of the wire plate, the first raised ring and the second raised ring are sequentially disposed outside the bearing mounting portion, and a plurality of wire winding grooves are formed in the wire plate.

Preferably, the height of the first raised ring is smaller than the height of the second raised ring, an elastic layer is disposed on an outer wall of the inner ring, the thickness of the elastic layer is 0.5-1 cm, protective plates are disposed at the lower end of the wire plate, and the protective plate is disposed at an interval from the wire winding groove.

Preferably, an extending portion is disposed at an upper portion of the wire winding groove, the extending portion and the wire plate are integrally formed, the bearing mounting portion is disposed concavely, the inner ring is disposed in the bearing mounting portion, and reinforcing ribs are disposed inside the wire plate.

Beneficial Effects of the Present Disclosure

The present disclosure provides a bearing assembly capable of preventing a lubricant from being thrown out, including: a bearing and a wire plate, a bearing mounting portion being disposed at an upper end of the wire plate, the bearing mounting portion being disposed concavely, an inner ring being disposed in the bearing mounting portion, a fixed portion is disposed at each of the two ends of the bearing, a first raised ring and a second raised ring being disposed in the middle of a lower end of the wire plate, a wiring groove being formed in the wire plate, and an inner wall of the inner ring being in abutting connection with an outer wall of the fixed portion. The bearing and the wire plate of the present disclosure are fixedly mounted via the fixed portions and the inner ring, and the lubricant can be directly added to the bearing in use. The fixed portion and the inner ring can prevent the lubricant from being thrown out during use, and the present disclosure is mounted on a motor via the first raised ring and the second raised ring. The first raised ring and the second raised ring can prevent dust from entering the bearing. In addition, the present disclosure is simple in structure and reasonable in design, and can effectively prolong the service life of the bearing and the wire plate.

A wire frame for a bearing includes a wire plate, a bearing mounting portion being disposed in the middle of the wire plate, an inner ring being disposed at an upper end of the wire plate, a first raised ring and a second raised ring being disposed in the middle of a lower end of the wire plate, the first raised ring and the second raised ring being sequentially disposed outside the bearing mounting portion, and a plurality of wire winding grooves being formed in the wire plate. When the present disclosure is used, the bearing is mounted in the bearing mounting portion. The sealability between the bearing and the wire plate can be better by means of the inner ring, so that the lubricant in the bearing can be prevented from being thrown out during the rotation of the bearing, and the present disclosure is mounted on a motor via the first raised ring and the second raised ring. The first raised ring and the second raised ring can prevent dust from entering the bearing.

REFERENCE NUMERALS

Figure 1:
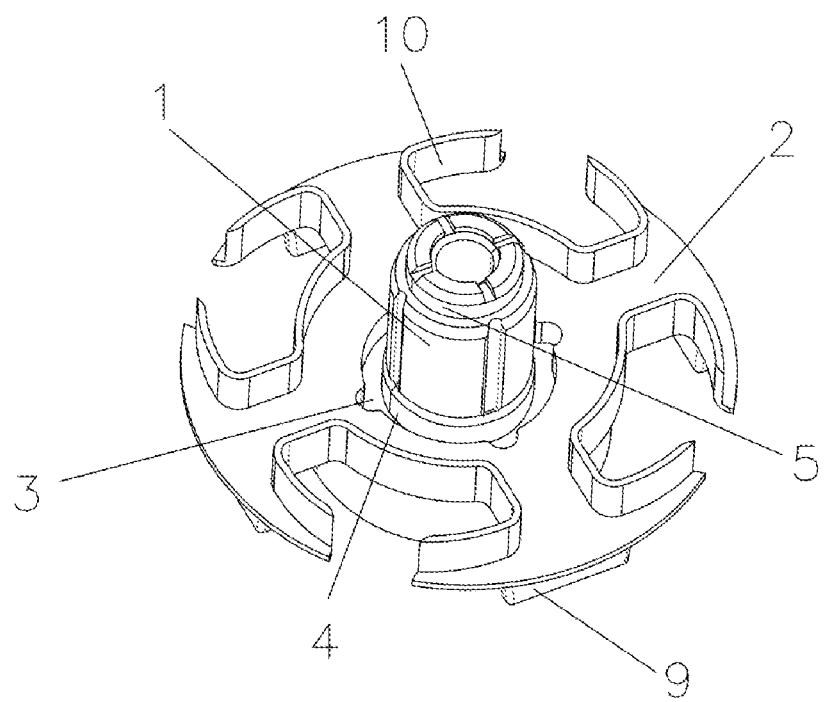
FIG. 1 is a schematic structural diagram of the present disclosure.
Figure 2:
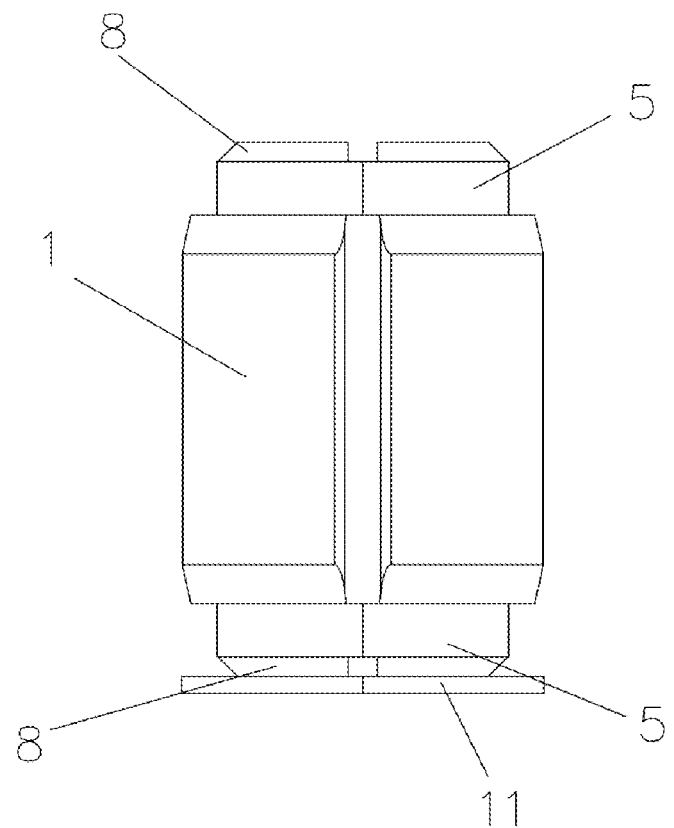
FIG. 2 is a schematic diagram of a bearing of the present disclosure.

Bearing—1, wire plate—2, bearing mounting portion—3, inner ring—4, fixed portion—5, first raised ring—6, second raised ring—7, extending portion—8, protective plate—9, extending plate—10, fixed plate—11, and wire winding groove—12.

DETAILED DESCRIPTION OF THE INVENTION

In order to facilitate the understanding of those skilled in the art, the present disclosure will be further described below with reference to the embodiments and the drawings, and the contents mentioned in the embodiments are not intended to limit the present disclosure. The present disclosure will be described in detail below with reference to the drawings.

Embodiment 1

As shown in FIG. 1 to FIG. 4, the present disclosure provides a bearing 1 assembly capable of preventing a lubricant from being thrown out, including: a bearing 1 and a wire plate 2. A bearing mounting portion 3 is disposed at an upper end of the wire plate 2. The bearing mounting portion 3 is disposed concavely. An inner ring 4 is disposed in the bearing mounting portion 3. A fixed portion 5 is disposed at each of the two ends of the bearing 1. A first raised ring 6 and a second raised ring 7 are disposed in the middle of a lower end of the wire plate 2. A wiring groove is formed in the wire plate 2, and an inner wall of the inner ring 4 is in abutting connection with an outer wall of the fixed portion 5. The bearing 1 and the wire plate 2 of the present disclosure are fixedly mounted via the fixed portion 5 and the inner ring 4, and the lubricant can be directly added to the bearing 1 in use. The fixed portion 5 and the inner ring 4 can prevent the lubricant from being thrown out during use, and the present disclosure is mounted on a motor via the first raised ring 6 and the second raised ring 7. The first raised ring 6 and the second raised ring 7 can prevent dust from entering the bearing 1. In addition, the present disclosure is simple in structure and reasonable in design, and can effectively prolong the service life of the bearing 1 and the wire plate 2.

In this embodiment, a plurality of extending portions 8 are disposed at a front end of the fixed portion 5. The extending portion 8 can increase the space inside the bearing 1, so that the bearing 1 contains more lubricant, and a guiding role can be played when the bearing 1 and the wire plate 2 are mounted.

In this embodiment, the height of the first raised ring 6 is smaller than the height of the second raised ring 7, and the present disclosure is disposed in a double-ring mode, which can further prevent the dust from entering the bearing 1.

In this embodiment, protective plates 9 are disposed at the lower end of the wire plate 2. A plurality of wire winding grooves 12 are formed in the wire plate 2. The protective plate 9 is disposed at an interval from the wire winding groove 12. An extending plate 10 is disposed at an upper portion of the wire winding groove 12, and the extending plate 10 and the wire plate 2 are integrally formed. The wire winding groove 12 of the present disclosure is used for wiring, and the protective plate 9 and the extending plate 10 are used for protecting the wire plate 2.

In this embodiment, reinforcing ribs are disposed both inside the bearing 1 and the wire plate 2. The reinforcing ribs of the present disclosure can increase the strength and hardness of the bearing 1 and the wire plate 2.

In this embodiment, a fixed plate 11 is disposed at a lower end of the bearing 1. The fixed portion 5 at the lower end of the bearing 1 is sleeved with the fixed plate 11, and the fixed plate 11 is used for connecting the present disclosure with other parts of a motor.

In this embodiment, the height of the inner ring 4 is greater than the height of the fixed portion 5. When the bearing 1 of the present disclosure is mounted on the wire plate 2, the space inside the bearing 1 can be further increased between the inner ring 4 and the fixed portion 5.

Embodiment 2

Figure 3:
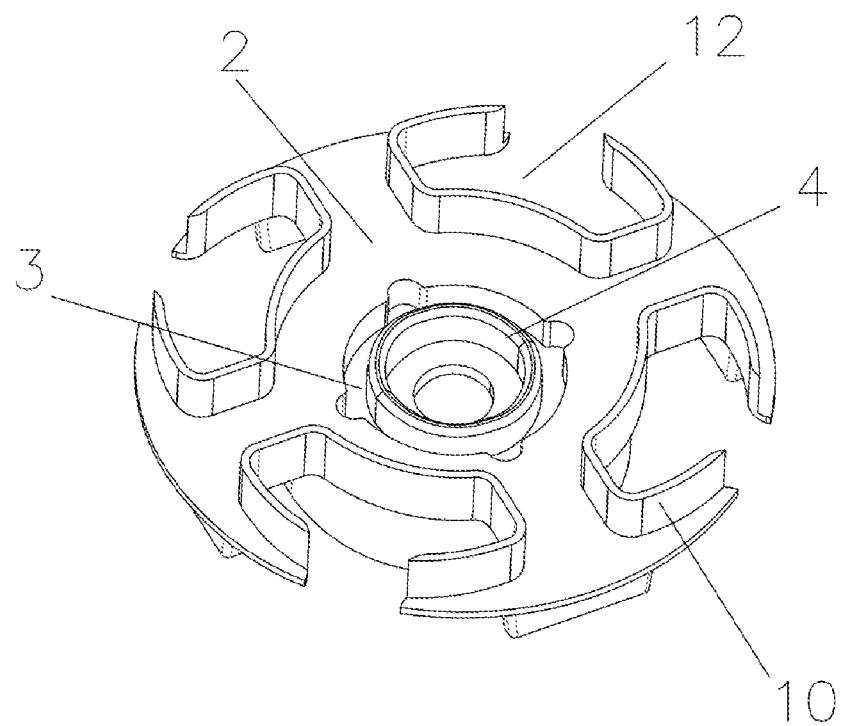
FIG. 3 is a schematic diagram of a wire plate of the present disclosure.
Figure 4:
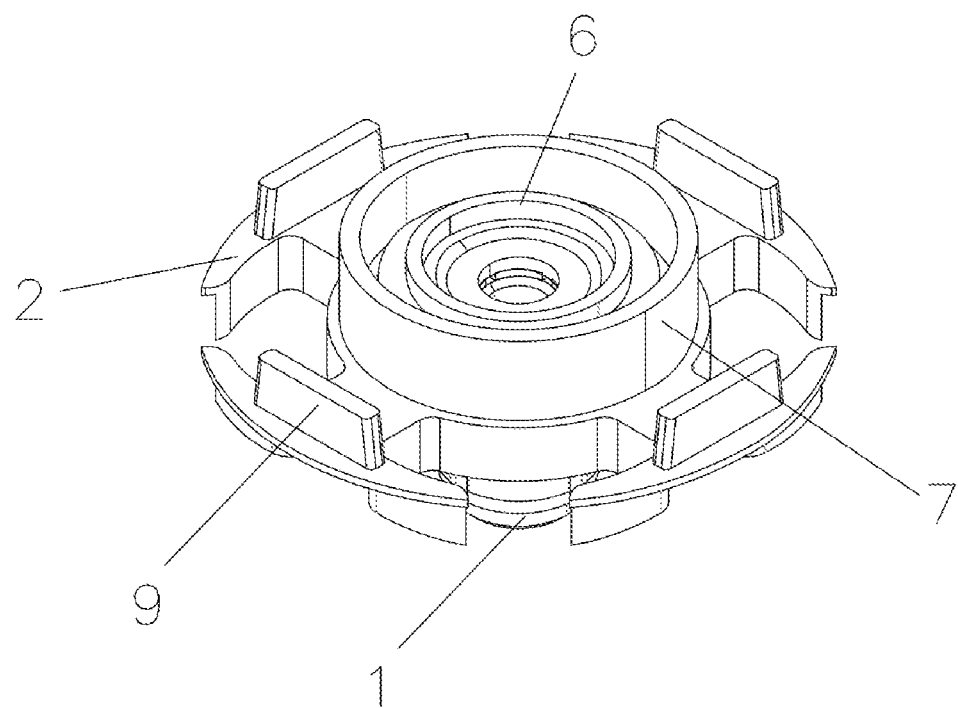
FIG. 4 is another schematic structural diagram of the present disclosure.

As shown in FIG. 3 to FIG. 4, the present disclosure provides a wire frame for a bearing, including a wire plate 2. A bearing mounting portion 3 is disposed in the middle of the wire plate 2. An inner ring 4 is disposed at an upper end of the wire plate 2. A first raised ring 6 and a second raised ring 7 are disposed in the middle of a lower end of the wire plate 2. The first raised ring 6 and the second raised ring 7 are sequentially disposed outside the bearing mounting portion 3, and a plurality of wire winding grooves 12 are formed in the wire plate 2. When the present disclosure is used, the bearing is mounted in the bearing mounting portion 3. The sealability between the bearing and the wire plate 2 can be better by means of the inner ring 4, so that a lubricant in the bearing can be prevented from being thrown out during the rotation of the bearing, and the present disclosure is mounted on a motor via the first raised ring 6 and the second raised ring 7. The first raised ring 6 and the second raised ring 7 can prevent dust from entering the bearing.

In this embodiment, the height of the first raised ring 6 is smaller than the height of the second raised ring 7, and the present disclosure is disposed in a double-ring mode, which can further prevent the dust from entering the inside of the bearing.

In this embodiment, in order to make the sealability between the inner ring and the bearing better, an elastic layer is disposed on an outer wall of the inner ring 4, and the thickness of the elastic layer is 0.5-1 cm.

In this embodiment, protective plates 9 are disposed at the lower end of the wire plate 2, and the protective plate 9 is disposed at an interval from the wire winding groove 12. An extending portion 8 is disposed at an upper portion of the wire winding groove 12. The extending portion 8 and the wire plate 2 are integrally formed. The wire winding groove 12 of the present disclosure is used for wiring, and the protective plate 9 and the extending portion 8 are used for protecting the wire plate 2.

In this embodiment, the bearing mounting portion 3 is disposed concavely. The inner ring 4 is disposed in the bearing mounting portion 3, and the bearing mounting portion 3 which is concavely disposed can be used for limiting and fixing the bearing.

In this embodiment, in order to enhance the strength and hardness of the present disclosure, reinforcing ribs are disposed in the wire plate 2.

The above are only preferred embodiments of the present disclosure, and are not intended to limit the present disclosure in any form. Although the present disclosure is disclosed with the preferred embodiments as above, it is not intended to limit the present disclosure. Within the scope of the technical solution of the present disclosure, some changes or modifications made by any skilled in this art when using the technical content disclosed above are considered as equivalent embodiments of equivalent changes. According to the technology of the present disclosure, any simple modification, equivalent change and modification made to the above embodiments, without departing from the content of the technical solution of the present disclosure, shall all belong to the scope of the technical solution of the present disclosure.

The invention claimed is:

1. A bearing assembly capable of preventing a lubricant from being thrown out, comprising: a bearing and a wire plate, a bearing mounting portion being disposed at an upper end of the wire plate, the bearing mounting portion being disposed concavely, an inner ring being disposed in the bearing mounting portion, a fixed portion being disposed at each of two ends of the bearing, a first raised ring and a second raised ring being disposed in the middle of a lower end of the wire plate, a wiring groove being formed in the wire plate, and an inner wall of the inner ring being in abutting connection with an outer wall of the fixed portion.

2. The bearing assembly capable of preventing a lubricant from being thrown out according to claim 1, wherein a plurality of extending portions are disposed at a front end of the fixed portion.

3. The bearing assembly capable of preventing a lubricant from being thrown out according to claim 1, wherein the height of the first raised ring is smaller than the height of the second raised ring.

4. The bearing assembly capable of preventing a lubricant from being thrown out according to claim 1, wherein protective plates are disposed at the lower end of the wire plate, a plurality of wire winding grooves are formed in the wire plate, the protective plate is disposed at an interval from the wire winding groove, an extending plate is disposed at an upper portion of the wire winding groove, and the extending plate and the wire plate are integrally formed.

5. The bearing assembly capable of preventing a lubricant from being thrown out according to claim 1, wherein reinforcing ribs are disposed both inside the bearing and the wire plate.

6. The bearing assembly capable of preventing a lubricant from being thrown out according to claim 1, wherein a fixed plate is disposed at a lower end of the bearing, and the fixed portion at the lower end of the bearing is sleeved with the fixed plate.

7. The bearing assembly capable of preventing a lubricant from being thrown out according to claim 1, wherein the height of the inner ring is greater than the height of the fixed portion.

8. A wire plate for a bearing, comprising: a wire plate, a bearing mounting portion being disposed in the middle of the wire plate, an inner ring being disposed at an upper end of the wire plate, a first raised ring and a second raised ring being disposed in the middle of a lower end of the wire plate, the first raised ring and the second raised ring being sequentially disposed outside the bearing mounting portion, and a plurality of wire winding grooves being formed in the wire plate.

9. The wire plate for a bearing according to claim 8, wherein the height of the first raised ring is smaller than the height of the second raised ring, an elastic layer is disposed on an outer wall of the inner ring, the thickness of the elastic layer is 0.5-1 cm, protective plates are disposed at the lower end of the wire plate, and the protective plate is disposed at an interval from the wire winding groove.

10. The wire plate for a bearing according to claim 9, wherein an extending portion is disposed on an upper portion of the wire winding groove, the extending portion and the wire plate are integrally formed, the bearing mounting portion is disposed concavely, the inner ring is disposed in the bearing mounting portion, and reinforcing ribs are disposed inside the wire plate.

* * * * *